United States Patent
Sasse et al.

(10) Patent No.: US 6,516,928 B2
(45) Date of Patent: Feb. 11, 2003

(54) HYDRODYNAMIC COUPLING DEVICE

(75) Inventors: Christoph Sasse, Schweinfurt (DE); Erwin Wack, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 day.

(21) Appl. No.: 09/800,812

(22) Filed: Mar. 7, 2001

(65) Prior Publication Data

US 2001/0020563 A1 Sep. 13, 2001

(30) Foreign Application Priority Data

Mar. 8, 2000 (DE) .......................................... 100 11 204

(51) Int. Cl.[7] .............................................. F16H 45/02
(52) U.S. Cl. ...................................... 192/3.28; 475/347
(58) Field of Search ................................. 188/290, 291, 188/293, 296; 192/3.29, 3.3; 60/326, 362; 475/347

(56) References Cited

U.S. PATENT DOCUMENTS

| 5,813,227 A | | 9/1998 | Dehrmann et al. ............ 60/367 |
| 6,099,434 A | * | 8/2000 | Sasse et al. ................. 475/347 |
| 6,155,392 A | * | 12/2000 | Kundermann ................ 192/3.3 |
| 6,223,872 B1 | * | 5/2001 | Heller et al. ................ 192/3.29 |
| 6,266,958 B1 | * | 7/2001 | Sasse et al. ................... 60/362 |
| 6,343,679 B1 | * | 2/2002 | Kundermann ................ 192/3.3 |
| 6,354,413 B2 | * | 3/2002 | Heller et al. ................ 192/3.29 |
| 6,374,601 B1 | * | 4/2002 | Sudau .......................... 60/326 |

FOREIGN PATENT DOCUMENTS

DE        198 38 445        4/1999

* cited by examiner

Primary Examiner—Christopher P. Schwartz
(74) Attorney, Agent, or Firm—Cohen, Pontani, Lieberman & Pavane

(57) ABSTRACT

A hydrodynamic coupling device comprises a casing arrangement and a turbine rotor which can be rotated about an axis of rotation (A) in the casing arrangement. The turbine rotor has a turbine rotor shell which supports a plurality of turbine rotor blades, and a turbine rotor hub which is coupled or can be coupled to a drive element for joint rotation. A lock-up clutch arrangement is provided for the optional production of a torque transmission connection between the turbine rotor and the casing arrangement, and a torsional vibration damper arrangement couples the turbine rotor for torque transmission to a coupling element of the lock-up clutch arrangement. A positive drive arrangement is provided on the torsional vibration damper arrangement, which positive drive arrangement is in drive engagement for torque transmission with a mating positive drive arrangement on the turbine rotor. The mating positive drive arrangement is formed integrally on the turbine rotor shell.

15 Claims, 1 Drawing Sheet

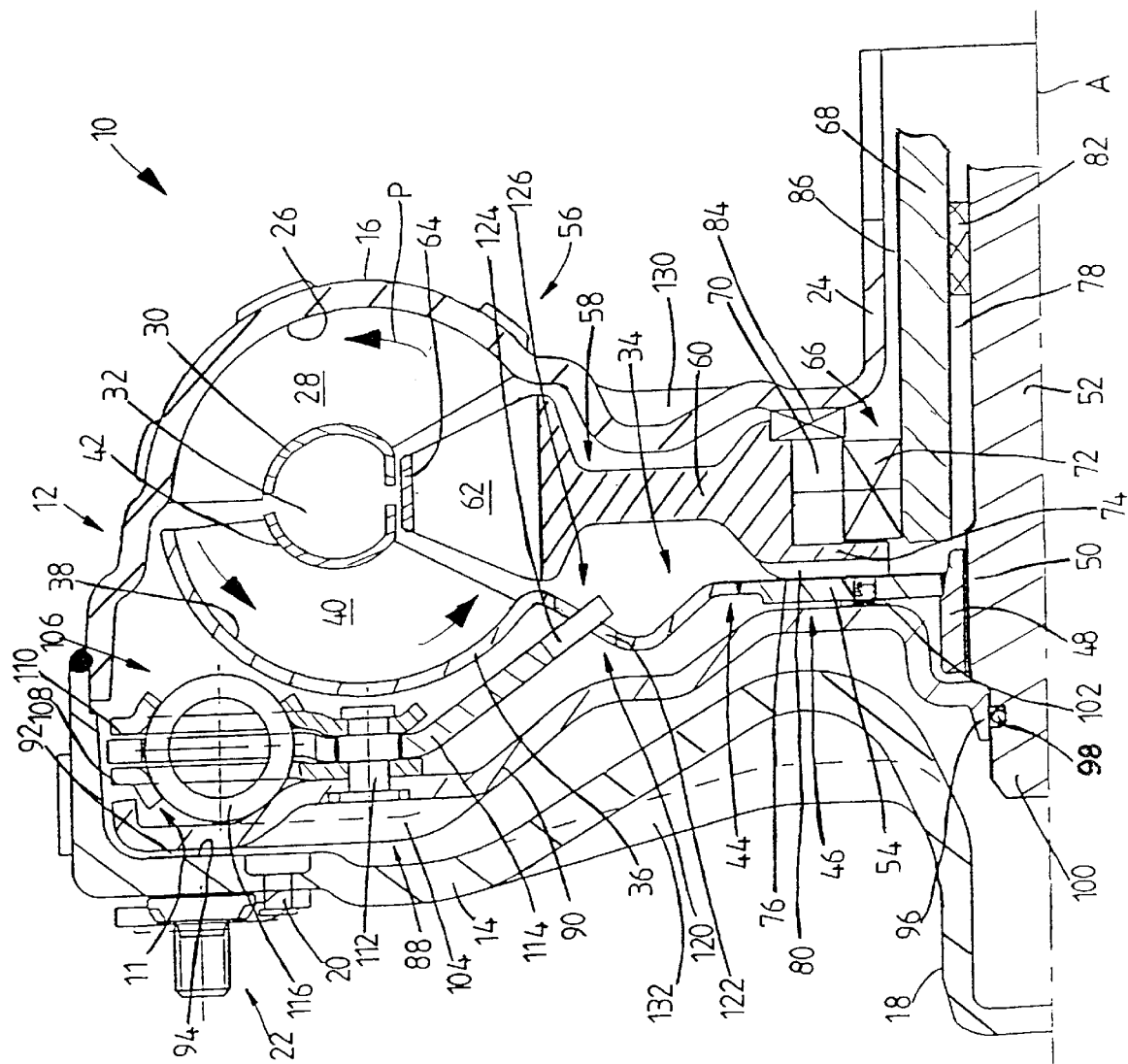

HYDRODYNAMIC COUPLING DEVICE

BACKGROUND OF THE INVENTION

1. Field of the Invention

The present invention relates to a hydrodynamic coupling device, in particular a hydrodynamic torque converter, including a casing arrangement and a turbine rotor which can be rotated about an axis of rotation in the casing arrangement. The turbine rotor has a turbine rotor shell which supports a plurality of turbine rotor blades, and a turbine rotor hub which is coupled or can be coupled to a drive element for joint rotation. A lock-up clutch arrangement is provided for the optional production of a torque transmission connection between the turbine rotor and the casing arrangement, and torsional vibration damper arrangement couples the turbine rotor for torque transmission to a coupling element of the lock-up clutch arrangement. A positive drive arrangement is provided on the torsional vibration damper arrangement, which positive drive arrangement is in drive engagement for torque transmission with a mating positive drive arrangement on the turbine rotor.

2. Description of the Related Art

A hydrodynamic coupling device of this type is known, for example, from U.S. Pat. No. 5,813,227. In this known hydrodynamic coupling device, a central disk element of the torsional vibration damping arrangement, which ultimately acts as a coupling element, has teeth protruding radially inward as a positive drive arrangement, which teeth are in interdigitating engagement with mating teeth on a drive element. This drive element is welded onto an outer side of the turbine rotor shell. On the other side, the turbine rotor blades are connected to the turbine rotor shell or are in contact with the latter. This construction has the problem that the attachment of the drive element by welding can lead to deformations in the region of the turbine rotor shell so that the flow characteristics of the same can be adversely affected.

DE 198 38 445 A1 reveals a hydrodynamic coupling device in the form of a hydrodynamic torque converter in which a region of the torsional vibration damping arrangement to be coupled to the turbine rotor is permanently coupled to the turbine rotor shell by riveting. In general, the riveting also represents an operational procedure which can only be undertaken after the connection of the turbine rotor shell to the turbine rotor blades so that, here again, it is not possible to ensure that no deformations of the turbine rotor occur per se during this operational procedure.

SUMMARY OF THE INVENTION

It is an object of the present invention to make available a hydrodynamic coupling device in which the torque transmission connection between a torsional vibration damper arrangement and a turbine rotor can be produced in a simple manner without the danger of any type of impairment being generated in the region of the turbine rotor.

According to the present invention, this object is achieved by a hydrodynamic coupling device, in particular a hydrodynamic torque converter, including a casing arrangement and a turbine rotor which can be rotated about an axis of rotation in the casing arrangement. The turbine rotor has a turbine rotor shell which supports a plurality of turbine rotor blades, and a turbine rotor hub which is coupled or can be coupled to a drive element for joint rotation. A lock-up clutch arrangement is provided for the optional transmission of torque between the turbine rotor and the casing arrangement, a torsional vibration damper arrangement and couples the turbine rotor for torque transmission to a coupling element of the lock-up clutch arrangement. A positive drive arrangement is provided on the torsional vibration damper arrangement, which positive drive arrangement is in drive engagement for torque transmission with a mating positive drive arrangement on the turbine rotor.

According to the invention, the positive drive arrangement is formed integrally on the turbine rotor shell.

The provision of this mating positive drive arrangement as an integral constituent of the turbine rotor shell makes it possible to form this arrangement as early as during the manufacture of the turbine rotor shell, i.e. at a time when the turbine rotor shell has not already been necessarily combined with the turbine rotor blades. It is then unnecessary to engage in further measures when the turbine rotor shell is joined together with the turbine rotor blades in order to be able to make such a mating positive drive arrangement available. Finally, therefore, the danger that any variety of damage can be generated in the region of the turbine rotor shell or the turbine rotor does not exist either. In addition, such an embodiment of the hydrodynamic coupling device according to the invention makes it possible to further reduce the number of parts and therefore to simplify its assembly.

As an example, it is possible to provide for the mating positive drive arrangement to comprise a plurality of drive apertures formed on the turbine rotor shell and for the positive drive arrangement to comprise a plurality of drive protrusions on a coupling element of the torsional vibration damper arrangement and integrally formed on it. In an embodiment variant which is particularly simple to manufacture, it is possible to provide for the drive apertures to be formed by engagement openings. These can, for example, be generated by punching or stamping.

According to a further aspect, the turbine rotor hub has an essentially sleeve-type first coupling region, radially located on the inside, for coupling to the drive element, and an essentially annular second coupling region for coupling to the turbine rotor shell.

According to U.S. Pat. No. 5,813,227, the two coupling regions of the turbine rotor hub are provided on an integrally configured component which can, for example, be manufactured by a casting process or can be brought to its shape by chip-removal machining. This, however, involves carrying out machining processes which are relatively complex and expensive and which lead to a high proportion of scrap, particularly in the case of chip-removal machining.

The invention therefore further proposes that the first coupling region and the second coupling region are components which are separately manufactured and permanently connected together.

Due to the design of the two coupling regions as separate components which have to be connected together, each of these components can be machined per se alone and can be manufactured from a material suitable for it. As an example, the annular second coupling region could be manufactured in a very simple and low-cost manner as a sheet-metal punched part. The two coupling regions can then be connected together by welding and, likewise, the second coupling region can be connected to the turbine rotor shell by welding.

According to a further aspect, the present invention relates to a hydrodynamic coupling device having a guide rotor arrangement with a guide rotor ring on which are carried a plurality of guide rotor blades and which is supported, on a support element, so that it can be rotated in one direction about the axis of rotation, by means of a bearing arrangement, for example a free-wheel arrangement.

In the hydrodynamic coupling device known from U.S. Pat. No. 5,813,227, a support or bearing ring is respectively provided on each axial side for the axial support of the guide rotor and of the guide rotor ring supporting the guide rotor blades, which support or bearing rings are, for example, held relative to the guide rotor ring by press-fit or/and by axial and radial support.

In order to be able to further reduce the number of parts in a hydrodynamic coupling device of this type, the invention therefore further proposes that a bearing section, which is axially supported on the turbine rotor or the casing arrangement, be integrally configured on the guide rotor ring. This bearing section can then, for example, be supported on the turbine rotor hub.

In order to ensure, in an arrangement of this type, that the working fluid necessary for the operation of the hydrodynamic coupling device can be guided into the internal space of the casing arrangement and can be withdrawn again from this internal space, it is further proposed that the bearing section should have at least one fluid duct to permit an exchange of fluid between a space region adjacent, radially on the inside, to the bearing section and a space region adjacent, radially on the outside, to the bearing section. The at least one fluid duct can be formed by shaping, stamping or the like.

In the coupling device according to the invention, furthermore, it is possible to provide for the free-wheel arrangement to comprise a free-wheel outer ring supporting the guide rotor ring and a plurality of free-wheel elements acting between the free-wheel outer ring and the support element.

In a preferred embodiment, furthermore, it is possible to provide for the free-wheel arrangement to comprise a free-wheel outer ring supporting the guide rotor ring and a plurality of free-wheel elements acting between the free-wheel outer ring and the support element. In this manner, it is possible, using simple structural measures, to maintain a fluid-tight drain between two space regions within the casing arrangement without, for example, having to provide a fluid-tight connection between the turbine rotor hub and the drive element.

In addition, it is possible to provide for the coupling element to be axially supported or to be able to be axially supported on the turbine rotor hub by means of a support element supported on the turbine rotor hub.

For further simplification of the assembly and/or to reduce the number of parts, it is furthermore possible to provide for the casing arrangement to have a pump rotor shell and a pump rotor hub integrally configured with the pump rotor shell.

According to a further aspect, the present invention relates to a hydrodynamic coupling device, in particular a hydrodynamic torque converter, including a casing arrangement and a turbine rotor which can be rotated about an axis of rotation in the casing arrangement. The turbine rotor has a turbine rotor shell which supports a plurality of turbine rotor blades, and a turbine rotor hub which is coupled or can be coupled to a drive element for joint rotation.

In such coupling devices, the danger exists that the casing will bulge out due to the fluid pressure existing within the casing arrangement so that in the presence of a lock-up clutch, for example, a friction surface provided on the casing is no longer in the desired position and local excessive wear of the same can therefore be generated.

In order to act against this, the invention further proposes that the casing arrangement should be provided with shape-stabilizing profiles in some regions.

The introduction of such profiles achieves a stiffening of the casing arrangement which acts against bulging of this type induced by fluid pressure. Particularly in the case where the casing arrangement is manufactured from sheet-metal parts, local hardening of the material can be obtained per se due to the reshaping of the same to form the form stabilization profiles by the generation of displacements within the lattice structure.

Particularly in the region of a pump rotor integrated into the casing arrangement or a shell of the same, it is possible to provide for at least a part of the shape-stabilizing profiles to be essentially arranged in the region radially between a torque transmission fluid circuit and the axis of rotation. As an alternative or additionally, particularly in the region of a casing cover, and if a lock-up clutch arrangement is provided for the optional transmission of torque between the turbine rotor and the casing arrangement and if a frictional surface region is formed on a casing element of the casing arrangement for interaction with a mating frictional surface region of the lock-up clutch arrangement, it is possible to provide for at least a part of the shape-stabilizing profiles to be arranged on the casing element in a region radially between the frictional surface region and the axis of rotation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

The sole FIGURE is a partial longitudinal section view of a hydrodynamic coupling device, according to the invention, in the form of a torque converter.

DETAILED DESCRIPTION OF THE PRESENTLY PREFERRED EMBODIMENTS

The torque converter 10 comprises a casing 12 which includes a casing cover 14 and a pump rotor shell 16. The casing cover 14 and the pump rotor shell 16 are permanently connected to one another, radially at the outside, for example by welding. The casing cover 14, which can be formed from a sheet-metal blank, forms a bearing trunnion 18 in its radially inner region, provided integrally on the latter, which bearing trunnion 18 can, for example, be accepted in a pilot bearing on a drive shaft. In addition, a plurality of rivet protrusions 20 made by forming or stamping is provided in a radially outer region on the casing cover 14. A coupling arrangement 22 can be permanently connected to the casing 12 by means of the rivet protrusions 20. This coupling arrangement 22 can be connected to a transmission plate, for example flex plate, connected to the drive shaft by screw connection, for example, so that the casing 12 is coupled to this drive shaft for joint rotation.

In its radially inner region, the pump rotor shell 16 is provided with an integral pump rotor hub 24 which substantially forms a hollow shaft and can be flattened on its external surface in at least two places in order to produce a torque transmission connection to a fluid pump provided, for example, within a gearbox. In its radially outer region and on an inner surface 26 of the same, the pump rotor shell 16 supports a plurality of pump rotor blades 28, which are connected with one another on the side located remote from the inner surface 26 by a pump rotor inner shell 30.

A turbine rotor 34 is also provided in the internal space 32 of the casing 12. This turbine rotor 34 has a turbine rotor shell 36 which supports a plurality of turbine rotor blades 40 on an inner surface 38 in its radially outer region. These turbine rotor blades 40 are in turn connected to one another by a turbine rotor inner shell 42 on the side facing away from the surface 38. In its radially inner region, the turbine rotor shell 36 is connected by welding 44 to a turbine rotor hub 46. The turbine rotor hub 46 comprises a first coupling region 48, of approximately sleeve-type configuration, and internal teeth which are in interdigitating engagement with external teeth 50 on a drive shaft 52, for example the gearbox input shaft. The turbine rotor hub 46 comprises, furthermore, a second coupling region 54 of approximately annular disk type configuration, which second coupling region 54 is formed, for example, from a sheet-metal material. The second coupling region 54 is permanently connected, radially on the inside, by welding to the first coupling region 48 and is then welded, radially at the outside at 44, to the turbine rotor shell 36.

A guide rotor 58 is located in the region axially between the turbine rotor 34 and the pump rotor 56. This guide rotor 58 essentially comprises a guide rotor ring 60, which supports on its outer peripheral region a plurality of guide rotor blades 62, which follow one another in the peripheral direction and are, for example, integrally formed onto the rotor guide ring 60. At the radially outer region located remote from the guide rotor ring 60, these guide rotor blades 62 are connected to one another by a connecting ring 64. At the inside radially, the guide rotor ring 60 is supported by means of a free-wheel arrangement 66 including a bearing 72 on a so-called support shaft 68 so that it can be rotated about the axis of rotation A. The support shaft 68 extends essentially coaxially within the pump rotor hub 24 and cannot rotate. By means of the free-wheel arrangement 66, which can for example have a free-wheel outer ring 70 and a plurality of free-wheel elements acting directly between the free-wheel outer inng 70 and an outer peripheral surface of the shaft 68, the guide rotor 58 can only rotate in one rotational direction about the axis of rotation A; it is, however, blocked from rotation in the other direction.

The guide rotor ring 60, which is manufactured for example from aluminum, has an integral flange or annular disk type bearing section 74, which extends radially inward over the free-wheel outer ring 70. This bearing section 74 forms axial support for the free-wheel arrangement 66 relative to the guide rotor ring 60 and, by means of its surface 76 facing the turbine rotor 34, forms a bearing surface by means of which the guide rotor ring 60 is axially supported on the turbine rotor hub 46, i.e. on the second coupling region 54 of the same. This, therefore, provides a sliding bearing arrangement region which is integrated in the guide rotor ring 60 and which makes the provision of an additional bearing arrangement, for example a rolling body bearing arrangement, superfluous. The bearing section 74 could likewise also be provided on the axial side and ultimately act to axially support the guide rotor ring 60 on the pump rotor shell 16.

In order to permit guidance of working fluid from a space region 78 between the support shaft 68 and the drive shaft 52 into the internal space 32 of the casing, at least one fluid duct 80 is formed by stamping or the like, for example, in the bearing section 74, which fluid duct 80 brings the space region 78 into fluid exchange connection with the internal space 32 of the casing 12. It should be pointed out that the drive shaft 52 can, for example, be supported by means of a fluid-permeable bearing arrangement 82 in the support shaft 68. On the other axial side, the guide rotor ring 60 and the free-wheel arrangement 66 is axially supported on the casing 12, i.e. the pump rotor shell 56, by means of a bearing arrangement 84, for example a roller bearing. This bearing arrangement 84 can likewise be fluid-permeable so that working fluid can likewise be supplied into the internal space 32 and be removed from the latter by means of the space region 86 between the pump rotor hub 24 and the support shaft 68. By the provision of the at least fluid duct 80, which is open toward the axial surface of the bearing section 74, it is simultaneously possible to ensure lubrication between the mutually contacting surface regions of the guide rotor ring 60 and the turbine rotor hub 46.

The torque converter 10 further includes a lock-up clutch arrangement 88. This lock-up clutch arrangement 88 in turn includes a clutch piston 90 which supports a friction lining 92 in its radially outer region. The surface of this friction lining 92 can be pressed against a friction surface 94 on the radially outer region of the casing cover 14. The clutch piston 90 extends radially inward and, in its central region, can be displaced in a fluid-tight manner and axially by means of a bearing section 96 with the intermediate arrangement of a sealing element 98 on an end section 100 of the drive shaft 52. Between the radially inner region of the clutch piston 90 and the second coupling region 54 of the turbine rotor hub 46 is located a bearing or support element 102, which is of annular configuration, for example, and which can, for example, be held on the turbine rotor hub 46 by permanent clipping, permanent riveting or the like. As, in the embodiment variant shown, the clutch piston 90 is guided directly and in a fluid-tight manner on the drive shaft 100, a fluid-tight separation is provided here in a reliable manner in the inner region between two space regions of the inner region, namely that space region which is formed between the clutch piston 90 and the pump rotor shell 16 and that space region which is formed between the clutch piston 90 and the casing cover 14.

In its region immediately adjacent, radially inside, to the friction lining 92, the clutch piston 90 is provided with a plurality of profiles 104, which may be shaped as ribs and follow one another in the peripheral direction. These profiles introduce a stable configuration of the clutch piston 90 and permit simple coupling between the same and a torsional vibration damper 106. The torsional vibration damper 106 comprises, as the primary side, two cover disk elements 108, 110, which are arranged at an axial distance from one another and are permanently connected to one another and which are permanently connected to the clutch piston 90 by a plurality of rivet bolts 112 in the region of the profiles 104. A radially outer region of a central disk element 114, which has peripheral apertures in the region of the rivet bolts 112 and can therefore be rotated in a limited rotational angle region relative to the cover disk elements 108, 110, is located axially between the two cover disk elements 108, 110. In a manner known per se, a plurality of springs 116, which follow one another in the peripheral direction of a damper element arrangement 11, acts between respective support regions of the cover disk elements 108, 110 and the central disk element 114. The torsional vibration damper 106 is coupled to the turbine rotor 34 by means of the central disk element 114. It may be seen that a mating positive drive arrangement 120, in the form of a plurality of through-access openings 122 formed, for example, by punching or stamping, is formed in the turbine rotor shell 36 in a region radially between the radially inner end of the turbine rotor blades 40 and the welding to the turbine rotor hub 46. A plurality of engagement protrusions 124, which ultimately together form a positive drive arrangement 126, is provided on the radially inner end region of the central disk element 114. These protrusions 124 engage essentially in the peripheral direction without clearance in the openings 122 and therefore provide a torque transmission connection between the torsional vibration damper 106 and the turbine rotor 34 without any sort of additional components, which have to be fastened to the turbine rotor 34, being necessary for this purpose. The openings 122 can, for example, be introduced into the turbine rotor shell 36 when a sheet-metal blank is punched out for the turbine rotor shell 36. No additional machining processes are then necessary for this purpose. Should fluid passage continue to be impossible through the turbine rotor shell 136 in this region, then instead of the through-access openings 122, it is of course also possible to provide apertures or depression regions, formed by stamping, for the engagement of the protrusions 124.

The torque converter 10 represented in the FIGURE is configured in such a way that the working fluid flow circuit, represented by flow arrows P, between the pump rotor 56, the turbine rotor 34 and the guide rotor 58 is at a relatively large distance from the axis of rotation A. The torsional vibration damper 106 is also placed relatively far out radially and is, ultimately, located with its essential components radially outside the maximum bulge of the turbine rotor shell 36. The positioning of these subassemblies and the fluid flow circuit at a relatively large distance from the axis of rotation A makes it possible for a relatively slim, axially short configuration of the torque converter 10 to be obtained in the region radially inside the torsional vibration damper 106 and radially inside the fluid circuit P. In order to ensure that the casing 12 is not deformed or bulged by the fluid pressure present in the internal space 32, respective shape-stabilizing profiles 130 and 132 can be provided on the turbine rotor shell 16 and on the casing cover 14. These shape-stabilizing profiles 130, 132 are, for example, arranged so that they follow one another in the peripheral direction and can be obtained by reshaping a sheet-metal blank during the manufacture of the respective components. The ribs 130 stiffen the pump rotor shell 16 in the region which is essentially located radially between the fluid circuit P and the axis of rotation A. In a corresponding manner, the ribs 132 stiffen the casing cover 14 in the region which is located essentially between the friction surface 92 or the adjacent rivet profiles 20 and the axis of rotation A. Despite the radially relatively large structure of the torque converter 10 according to the invention, a very stable embodiment of the casing 12 is obtained in this manner, in the sections of the casing 12 which are particularly susceptible to bulging, by the provision of these profiles, which can for example have a rib shape. When so shaped they are referred to as reinforcing ribs.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic coupling device comprising
    a casing arrangement,
    a turbine rotor which can be rotated about an axis of rotation in the casing arrangement, said turbine rotor comprising a turbine rotor hub, which can be coupled to a drive element for joint rotation, a turbine rotor shell fixed to said hub and having a plurality of integrally formed drive apertures, and a plurality turbine rotor blades fixed to said shell,
    a lock-up clutch arrangement for the optional production of a torque transmission connection between the turbine rotor and the casing arrangement, and
    a torsional vibration damper arrangement which couples the turbine rotor for torque transmission to the lock-up clutch arrangement, said torsional vibration damper comprising a coupling element having a plurality of integrally formed drive protrusions which engage in respective said drive apertures in said turbine rotor shell essentially without clearance in the peripheral direction to form a positive drive arrangement.

2. A hydrodynamic coupling device as in claim 1 further comprising
    a guide rotor comprising a guide rotor ring, a plurality of guide rotor blades fixed to said ring, and a bearing section inteally formed on the guide rotor ring, said bearing section being axially supported on one of the casing and the turbine rotor, and
    a bearing arrangement for supporting said guide rotor ring on a support element so that said guide rotor can be rotated in one direction about said axis of rotation.

3. The hydrodynamic coupling device as claimed in claim 2, wherein the bearing section has at least one fluid duct to permit an exchange of fluid between a space region adjacent, radially on the inside, to the bearing section and a space region adjacent, radially on the outside, to the bearing section.

4. The hydrodynamic coupling device as claimed in claim 3, wherein the at least one fluid duct is formed by forming, stamping or the like.

5. The hydrodynamic coupling device as claimed in claim 2, wherein the bearing section is supported on the turbine rotor hub.

6. The hydrodynamic coupling device as claimed in claim 2, wherein said bearing arrangement is a free-wheel arrangement comprising a free-wheel ring supporting the guide rotor ring and a plurality of free-wheel elements acting between the free-wheel outer ring and the support element.

7. A hydrodynamic coupling device as in claim 1 wherein said turbine rotor hub comprises a sleeve-type first coupling region, located radially on the inside, for coupling to a drive element, and an annular second coupling region connected to the turbine rotor shell, said first and second couplin regions being separately manufactured and permanently connected together.

8. The hydrodynamic coupling device as claimed in claim 7, wherein the first coupling region and the second coupling region are connected together by welding.

9. The hydrodynamic coupling device as claimed in claim 7, wherein the second coupling region and the turbine rotor shell are connected together by welding.

10. A hydrodynamic coupling device as claimed in claim 1 wherein said casing arrangement has regions provided with shape-stabilizing profiles.

11. The hydrodynamic coupling device as claimed in claim 10, wherein at least a part of the shape-stabilizing profiles is essentially arranged in the region radially between a torque transmission fluid circuit and the axis of rotation.

12. The hydrodynamic coupling device as claimed in claim 10 further comprising a frictional surface region on a casing element of the casing arrangement for interaction with a mating frictional surface region of the lock-up clutch arrangement, at least a part of the shape-stabilizing profiles being arranged on the casing element in a region radially between the frictional surface region and the axis of rotation.

13. The hydrodynamic coupling device as claimed in claim 1, wherein said lock-up clutch arrangement comprises a coupling element which is supported in a fluid-tight manner on the drive element, which coupling element is connected to the turbine rotor for joint rotation.

14. The hydrodynamic coupling device as claimed in claim 13, wherein the coupling element is axially supported on the turbine rotor hub by means of a bearing element supported on the turbine rotor hub.

15. The hydrodynamic coupling device as claimed in claims 1, wherein the casing arrangement comprises a pump rotor shell and a pump rotor hub formed integrally with the pump rotor shell.

* * * * *